US009605763B2

(12) United States Patent
Martinez et al.

(10) Patent No.: US 9,605,763 B2
(45) Date of Patent: Mar. 28, 2017

(54) OPENING OR CLOSURE LIMITING DEVICE SUITABLE FOR VALVES

(71) Applicants: Activos Alan, S.L., Malaga (ES); Ingevert 2000, S.L., Malaga (ES)

(72) Inventors: Antonio Mediato Martinez, Malaga (ES); Francisco Garcia Vacas, Malaga (ES); Francisco Vertedor Sanchez, Malaga (ES)

(73) Assignees: Ingevert 2000, S.L., Malaga (ES); Aeris Soluciones de Control, S.L., Malaga (ES)

( * ) Notice: Subject to any disclaimer, the term of this patent is extended or adjusted under 35 U.S.C. 154(b) by 208 days.

(21) Appl. No.: 14/449,215

(22) Filed: Aug. 1, 2014

(65) Prior Publication Data
US 2015/0041698 A1    Feb. 12, 2015

(30) Foreign Application Priority Data

Aug. 12, 2013  (EP) .................................. 13382328

(51) Int. Cl.
*F16K 1/52*    (2006.01)
*F16K 1/22*    (2006.01)

(52) U.S. Cl.
CPC .............. *F16K 1/523* (2013.01); *F16K 1/221* (2013.01)

(58) Field of Classification Search
CPC . F16K 1/523; F16K 1/221; F16K 1/50; F16K 5/0242; F16K 5/0442; F16K 5/0647; F16K 31/60; F16K 31/602; F16K 35/027
USPC ........................................ 251/285, 286, 288
See application file for complete search history.

(56) References Cited

U.S. PATENT DOCUMENTS

| 23,902 | A | * | 5/1859 | Cope et al. | ............... | B23K 5/22 |
| | | | | | | 137/259 |
| 31,465 | A | * | 2/1861 | Leffingwell | ............. | F16K 1/523 |
| | | | | | | 237/3 |
| 539,466 | A | * | 5/1895 | Winter | ..................... | F16K 17/36 |
| | | | | | | 137/45 |
| 668,557 | A | * | 2/1901 | Englen | .................. | F16K 5/0647 |
| | | | | | | 251/288 |
| 918,072 | A | * | 4/1909 | Miller | ................. | F16K 37/0016 |
| | | | | | | 137/556.6 |
| 1,015,164 | A | * | 1/1912 | Brocke | ............... | F16K 37/0008 |
| | | | | | | 137/556.3 |
| 1,016,064 | A | * | 1/1912 | Powden | ................. | B62D 5/097 |
| | | | | | | 137/625.21 |

(Continued)

FOREIGN PATENT DOCUMENTS

DE    102009005004    7/2010
EP        0021885 A1 *    1/1981    ............. F16K 1/221

(Continued)

OTHER PUBLICATIONS

European Search Report for related European Patent Application No. EP 13 38 2328, dated Jan. 20, 2014.

*Primary Examiner* — Marina Tietjen
(74) *Attorney, Agent, or Firm* — Caesar Rivise, PC

(57) ABSTRACT

The object of the present invention is an opening or closure limiting device suitable for valves. This device is suitable for establishing a maximum degree of opening in the valve, a maximum degree of closure (or minimum opening), or both; this operation is carried out manually without said limitation preventing the valve from being managed by means of an actuator.

14 Claims, 5 Drawing Sheets

(56) References Cited

U.S. PATENT DOCUMENTS

| | | | | |
|---|---|---|---|---|
| 1,132,095 | A * | 3/1915 | Hutchison | F16K 37/0016 137/556.6 |
| 1,306,006 | A * | 6/1919 | Gustafson | F16K 3/03 251/212 |
| 1,477,023 | A * | 12/1923 | Anderson | F16K 1/52 251/260 |
| 1,534,866 | A | 4/1925 | Page | |
| 1,598,716 | A * | 9/1926 | Greuter | F02M 1/00 137/630.19 |
| 1,704,209 | A * | 3/1929 | Parry | C10B 21/14 137/559 |
| 2,349,727 | A * | 5/1944 | Hopkins | F16K 1/221 137/552 |
| 2,514,431 | A * | 7/1950 | West | B24C 7/00 137/329 |
| 2,672,156 | A * | 3/1954 | Lecarmure | F02D 9/00 137/484 |
| 3,134,405 | A | 5/1964 | White et al. | |
| 3,807,254 | A * | 4/1974 | Brakebill | G05G 5/04 116/320 |
| 3,813,080 | A * | 5/1974 | Rogers | A01G 25/16 251/285 |
| 3,865,130 | A | 2/1975 | Mullis | |
| 3,976,095 | A | 8/1976 | Koch et al. | |
| 4,203,572 | A | 5/1980 | Coffman | |
| 5,259,589 | A | 11/1993 | Posner | |
| 5,329,959 | A | 7/1994 | Owen et al. | |
| 5,647,389 | A * | 7/1997 | Holloway | F16K 31/602 137/15.18 |
| 5,887,850 | A * | 3/1999 | Ruffalo | B60T 17/043 16/110.1 |
| 7,849,877 | B2 * | 12/2010 | Tan | F16K 11/0853 137/625.46 |
| 8,215,614 | B2 * | 7/2012 | Parsons | F16K 31/05 251/248 |
| 2002/0074041 | A1 | 6/2002 | Niessen | |
| 2005/0161624 | A1 * | 7/2005 | Bancroft | F16K 31/602 251/109 |
| 2007/0289588 | A1 * | 12/2007 | Martin | F16K 31/602 126/295 |
| 2008/0061261 | A1 * | 3/2008 | Weston | F16K 31/602 251/305 |

FOREIGN PATENT DOCUMENTS

| | | | | |
|---|---|---|---|---|
| FR | 2462630 A1 * | 2/1981 | | F16K 1/221 |
| FR | 2585440 A1 * | 1/1987 | | F16K 1/221 |
| JP | 3148301 U * | 2/2009 | | F16K 5/0647 |
| WO | WO2010063515 | 6/2010 | | |

* cited by examiner

OPENING OR CLOSURE LIMITING DEVICE SUITABLE FOR VALVES

OBJECT OF THE INVENTION

The object of the present invention is an opening or closure limiting device suitable for valves. This device is suitable for establishing a maximum degree of opening in the valve, a maximum degree of closure (or minimum opening), or both; this operation is carried out manually without said limitation preventing the valve from being managed by means of an actuator.

BACKGROUND OF THE INVENTION

Managing flow in a conduit by means of a valve allows establishing different degrees of conduit closure, from completely closed to completely open. This variation in the degree of closure depends on the angle adopted by the valve plug such that the plug restricts the passage to a greater or lesser extent.

There are circumstances in which the maximum degree of closure, the maximum degree of opening, or both, must be limited. This is the case when there is a need to assure minimum flow through the conduit at all times, minimum opening situation; or to assure a minimum pressure drop, maximum opening situation, for example.

This maximum degree of closure or opening can be established by means of fixed stops suitably located in a position inside the conduit, being interposed in the plug trajectory. Given that the plug mechanically interferes with the stop, the range of angular movement of the plug is thus limited by the limit position established by the stop.

The stop which moves integrally with the plug can be regulated by means of a screw. Screwing or unscrewing this screw modifies the position of the stop and therefore the position of the maximum degree of opening or closure. One way to carry out such maximum regulation consists of the screw itself acting as a stop. In this case the screwing or unscrewing linearly moves the position of the end of the screw and therefore the position in which the plug abuts. Such regulation is difficult and above all very limited angle-wise. Additionally, when the threaded element is in contact with the flow in the conduit the probability of its operation being affected by dirt is very high.

The present invention provides an opening or closure limiting device suitable for valves allowing a manual, quick and very mechanically safe regulation. Furthermore, this limitation does not prevent the use of additional limitations in the opening or closure such as limitations imposed by the actuator moving the plug.

SUMMARY OF THE INVENTION

The present invention is an opening or closure limiting device suitable for valves, allowing highly robust embodiments and the operation of which is assured even in very dirty conditions and extreme temperatures.

This device is applicable to those valves the plug of which rotates about a rotating shaft inside a conduit.

The limiting device comprises:
- a support the configuration of which extends in a main plane which is located essentially perpendicular to the direction of the rotating shaft, and where said support comprises:
  - fixing means suitable for fixing said support to the conduit in which the valve is located,
  - a fixed shaft for a regulating arm for regulating the maximum value or for regulating the minimum value of the opening of the plug, this fixed shaft being arranged essentially perpendicular to the main plane of the support,
  - first locking means for locking the angular position of the arm.

The two main components of the device are the support and the arm linked to said support. The fixing means of the support assure that the support is integral with the conduit; i.e., the support is fixed to the conduit. The regulating arm rotating about the fixed shaft of the support is located on this support.

The configuration of the support extending in a main plane located essentially perpendicular to the direction of the rotating shaft of the plug means that the movements of the regulating arm are also primarily in this main plane except in some embodiments when the arm is provided with a small rotation with which it achieves a small inclination which allows unlocking and locking the position of the arm in different angular positions. This arm is responsible for determining the limit of the angular position of the plug, or the maximum value or the minimum value of its opening.

To achieve this objective, the arm of the device additionally comprises:
- a housing for the fixed shaft for the rotation of the arm about said fixed shaft,
- second locking means suitable for retaining the arm in the first locking means in a specific angular position with respect to the support.

The housing for the fixed shaft houses said shaft defining the point of rotation of the arm with respect to the support. Given that there are first locking means located in the support and second locking means located in the arm and these second locking means are suitable for retaining the arm upon interacting with the first means in a specific angular position, the arm is provided with the capacity to rotate about the fixed shaft of the support except when both locking means are interacting with one another, preventing said rotation.

As will be seen in the description of a preferred example, the arm allows different angular positions. Once the desired angular position is selected, the locking means retain the arm in said angular position.

According to the invention, the components of the device additionally verify that the rotating shaft of the plug has a projection integral with said rotating shaft, the projection being intended to abut the arm, limiting the angular movement of said rotating shaft and therefore of the plug.

The plug rotates about its shaft, driving the projection integral with said shaft along. Therefore, once the angular position of the arm is fixed, the movement of this projection about the shaft of the plug is limited by the arm from the moment it abuts the arm. Given that the angular position of the arm can be determined assuring the locking at different points of the support, the limitation of the movement of the projection can also be established in different angular positions of the projection and, as a result, the movement of the plug is also established in different angular positions since it also rotates integrally with the projection.

The preferred example describes a particular embodiment in which two arms arranged in a symmetrical position are used. This relation allows regulating the minimum degree of opening, the maximum degree of opening and both independently established limits independently.

DESCRIPTION OF THE DRAWINGS

The foregoing and other advantages and features of the invention will be better understood from the following detailed description of a preferred embodiment given only by way of illustrative and non-limiting example in reference to the attached drawings.

DETAILED DESCRIPTION OF THE INVENTION

Figure 1A:
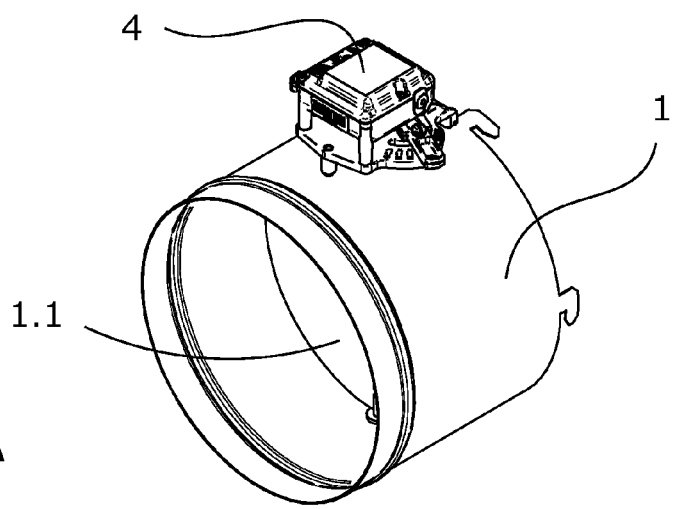
FIG. 1A shows a perspective view of a section of a conduit with a valve actuated by means of an electric actuator where an embodiment of the invention is arranged between the electric actuator and the conduit for limiting the minimum degree of opening and the maximum degree of opening.

According to the first inventive aspect, the present invention is an opening or closure limiting device suitable for valves. FIG. 1A shows a particular embodiment of the invention which will be shown throughout the remaining drawings in different perspectives and positions to show the various technical solutions that have been incorporated.

FIG. 1A shows a perspective view of a section of a conduit (1) containing a valve. The plug (1.1) is disc-shaped such that when placed transverse to the conduit (1) it coincides with the section thereof and establishes the closure of the flow through said conduit (1).

The plug (1.1) rotates about a rotating shaft (1.2). In this embodiment, this rotating shaft (1.2), which can be seen in FIG. 1B, is made up of at least two shaft sections, each located at one end of the geometric axis of rotation of the plug (1.1), for pivoting in a perforation existing in the conduit (1).

Figure 1B:
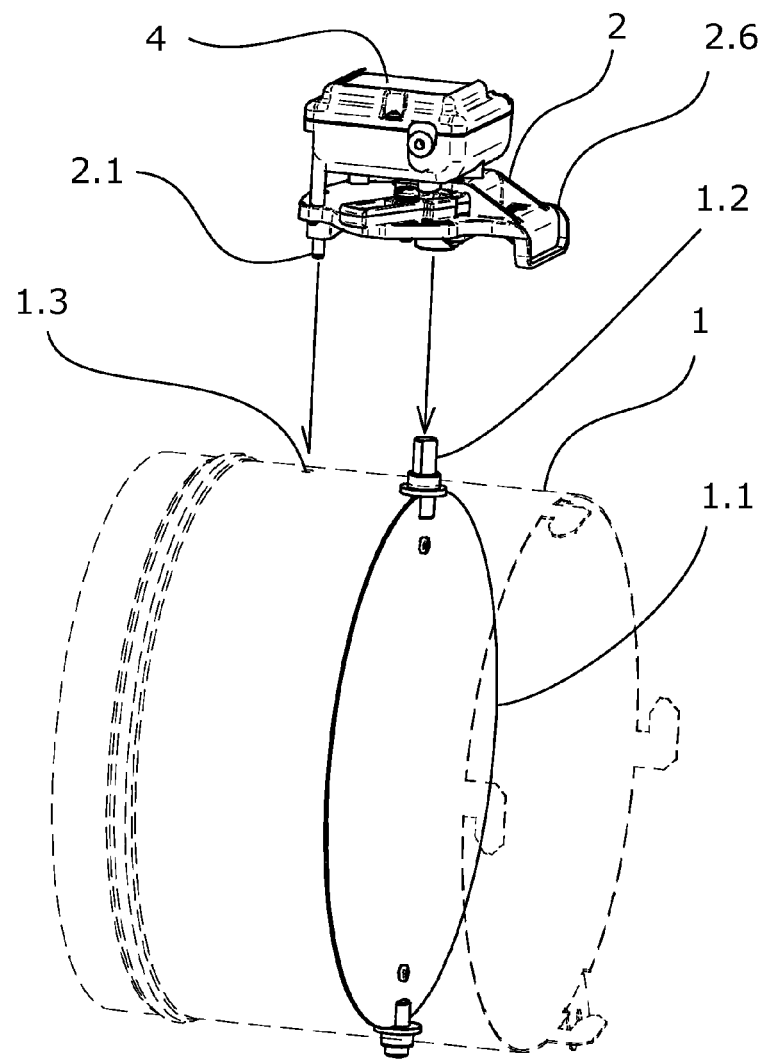
FIG. 1B shows an exploded perspective view of the same preceding embodiment which allows observing the coupling of the assembly formed by the actuator and the device according to the embodiment on the valve.

As shown in the exploded perspective view of FIG. 1B, one of these sections of the rotating shaft (1.2) particularly extends in the upper portion, upper portion being understood as the relative position shown in the drawing according to the chosen orientation in order to reach an actuator (4). The actuator (4) is a servomotor controlled by a central processing unit not shown in the drawing, responsible for rotating the plug (1.1), opening or closing it.

The actuator (4) can be programmed so that the angular position that it confers to the plug (1.1) is in a maximum and minimum range. Nevertheless, an actuator failure causes these limits to be inadequately assured, or the end position of the plug (1.1) to not be precise enough.

According to one embodiment of the invention, the opening or closure limiting device is placed between the actuator (4) and the conduit (1). Said FIG. 1B shows the limiter located below the actuator (4). The bulkiest part is a support (2) the main body of which primarily extends in a plane transverse to the longitudinal axis of the rotating shaft (1.2).

Protruding from the support (2) there is a support (2.6) resting on the conduit (1) and a nipple (2.1) housed in a perforation (1.3) of the conduit (1) acting as fixing means between the support (2) and the conduit (1) such that the support (2) is integral with the conduit (1), preventing relative rotation, for example. Given that it limits the rotation of the plug (1.1), these fixing means are designed for absorbing the torques conferred by the plug (1.1) when the device limits the closure or opening.

Figure 2:
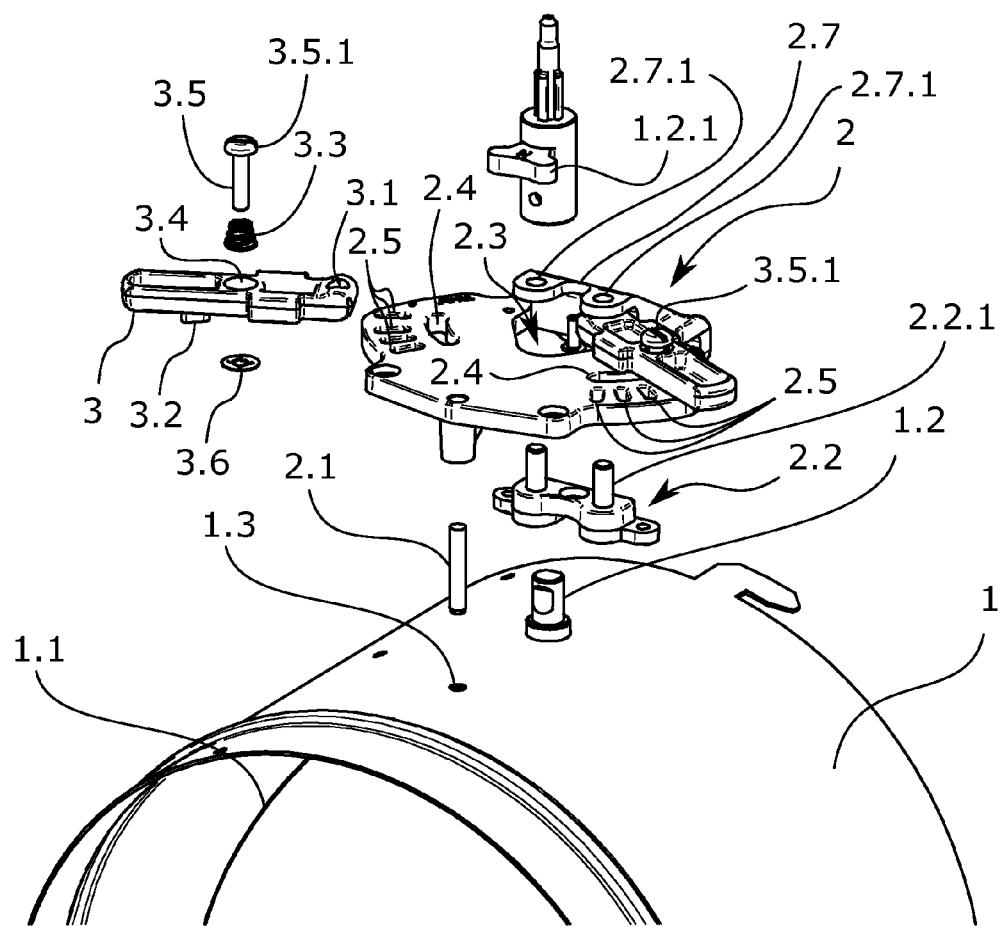
FIG. 2 shows an exploded perspective view with a section of the conduit and with the device of the embodiment being disassembled.

FIG. 2 shows an exploded perspective view of the limiter of the embodiment after having removed the actuator in order to see the different components and portions of the limiting device.

In this view, the support (2) is seen with a hole (2.3) allowing the passage of the rotating shaft (1.2). This configuration allows the elements which limit the angular movement of the plug (1.1) to be placed on the support (2); i.e., on the side of the main plane of the support (2) opposite where the conduit (1) and the plug (1.1) are located. In this position, the user can see the elements allowing the limitation, facilitating their handling.

The two most relevant elements in limiting the rotation of the plug (1.1) are: an arm (3) and a projection (1.2.1) integral with the rotating shaft (1.2) of the plug (1.1).

The projection (1.2.1) integral with the rotating shaft (1.2) of the plug (1.1) is intended for abutting the arm (3) such that the position of the arm (3) determines the angle with which the projection (1.2.1) is hindered, limiting the rotation of the plug (1.1) as a result.

In the embodiment of the invention shown in the drawings, two arms (3) are symmetrically arranged with respect to a plane containing the rotating shaft (1.2) of the plug (1.1) such that one arm (3) is responsible for limiting the maximum closure of the plug (1.1) and the other arm (3) is responsible for limiting the maximum opening of the plug (1.1).

The particular way to independently position each of the arms (3) limiting the projection (1.2.1) integral with the rotating shaft (1.2) is described below.

The support (2) has a fixed shaft (2.2.1) for each arm (3). Each arm (3) in turn has a housing (3.1) for this fixed shaft (2.2.1) such that the arm (3) rotates with respect to said fixed shaft (2.2.1).

Figure 3:
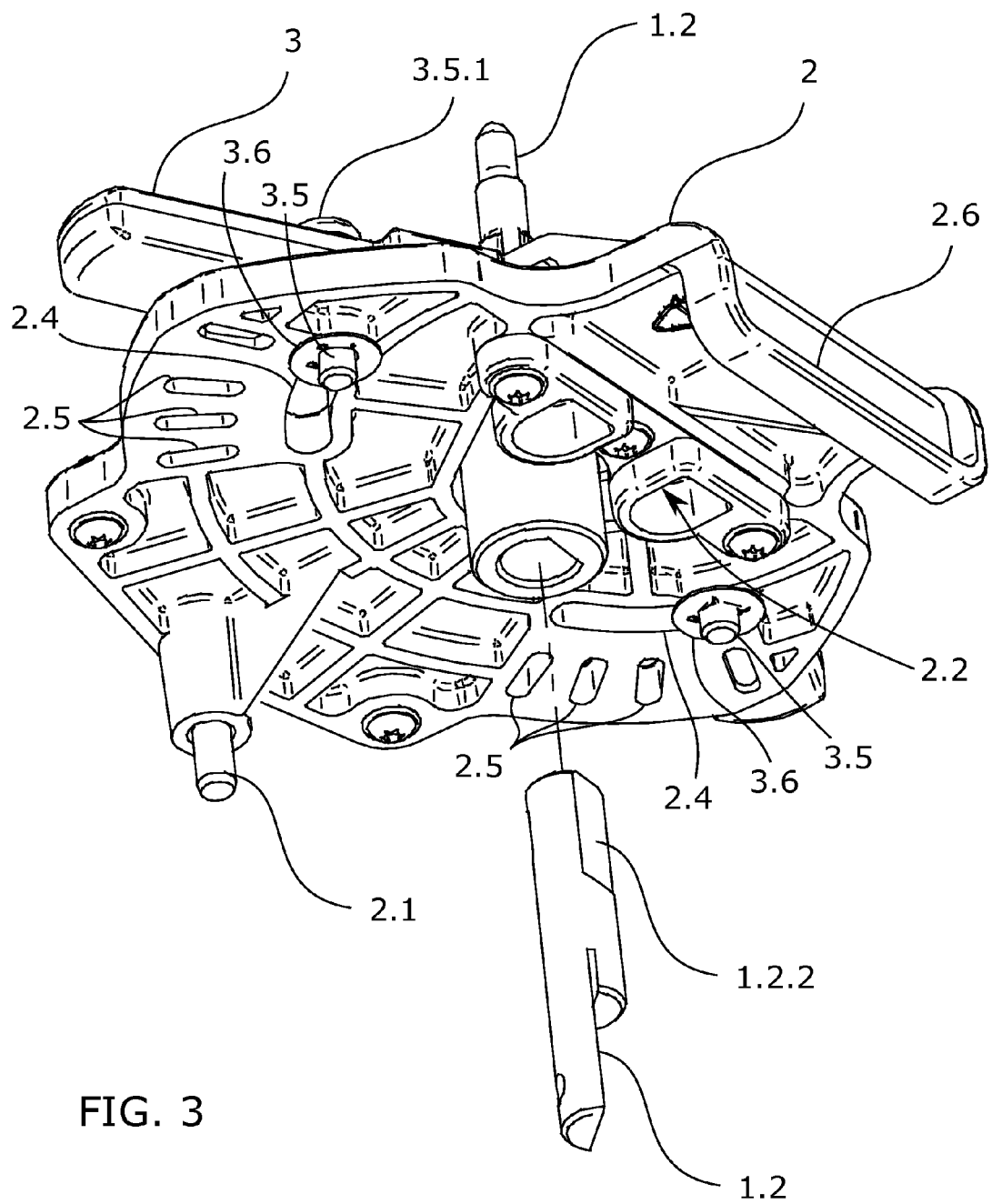
FIG. 3 shows a perspective view of the device according to the embodiment where the point of view is located below the main plane of the support to allow observing the configuration of the parts comprised in this embodiment according to the face towards which the conduit is oriented.

In this embodiment, the two fixed shafts (2.2.1) belong to one and the same intermediate part (2.2) formed by a platform with perforations intended for receiving fixing screws. As shown in FIG. 3, the platform is screwed onto the support (2) in its lower face, i.e., on the side of the main plane of the support (2) where the conduit (1) is located.

The support (2) has a fixed support (2.7) separated from the main plane of said support (2) where this fixed support (2.7) has one perforation (2.7.1) per fixed shaft (2.2.1) intended for receiving the ends of the fixed shafts (2.2.1) of the intermediate part (2.2). This configuration facilitates assembling the arms (3) since once the fixed shaft (2.2.1) is located in the housing (3.1) of the arm (3), the intermediate part (2.2) is fixed in the support (2) by placing the ends of the fixed shafts (2.2.1) in the perforations (2.7.1) of the fixed support (2.7), the arms (3) are attached to the support (2) and provided to at least rotate about its fixed shaft (2.2.1).

The rotation of the arm (3) about its fixed shaft (2.2.1) establishes different positions in which the projection (1.2.1) integral with the rotating shaft (1.2) of the plug (1.1) abuts, limiting the angular movement thereof.

The point where the projection (1.2.1) abuts the arm (3) is established by means of first locking means (2.5) located in the support (2) and second locking means (3.2) located in the arm (3) cooperating with one another for determining a fixed position of the arm (3) with respect to the support (2).

In this embodiment of the invention, the first locking means (2.5) are made up of a plurality of housings (2.5). The second locking means (3.2) are made up of a flange (3.2) of the arm (3) such that the housings (2.5) are suitable for receiving and housing the flange of the arm (3).

The plurality of housings (2.5) is distributed in an arc equidistantly spaced from one another. Each housing (2.5) determines a position of the arm (3). A distribution which is not equidistantly spaced but rather the positions determine relevant positions of the opening of the plug (1.1), as occurs in this embodiment, is possible. The distribution of the plurality of housings (2.5) in an arc is such that the center of the arc is determined by the position of the fixed shaft (2.2.1) since it is the trajectory described by the flange (3.2) of the arm (3).

In this embodiment, the arm (3) is also provided with a bias to move closer to the support (2). This bias allows the flange (3.2) to not come out of said housing once the flange (3.2) of the arm (3) is housed in a housing (2.5) of the support (2), assuring the locking of its position. This bias is achieved with an elastic element as described below.

Figure 4A:
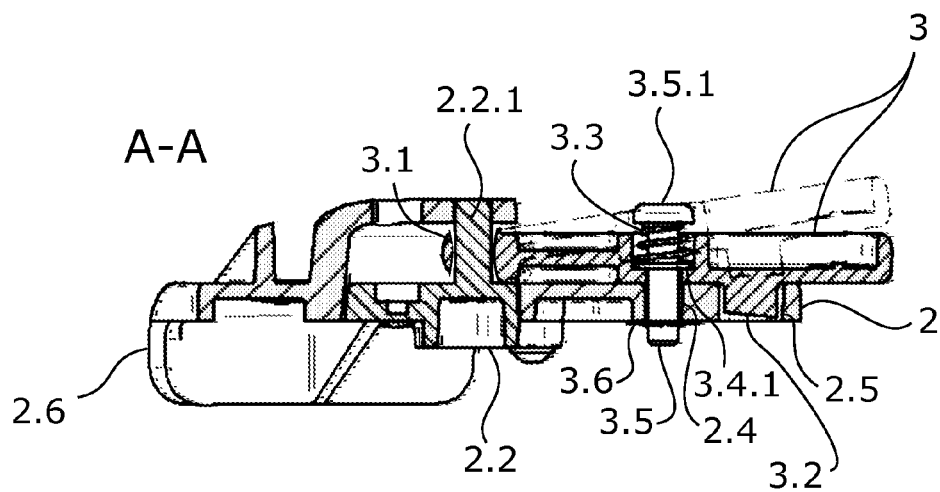
FIG. 4A shows a top view of the support of the limiting device according to the embodiment.

As shown in the section A-A of FIG. 4A, the arm (3) has a through housing (3.4) with a lower support base (3.4.1). The through housing (3.4) houses a helical spring (3.3), the elastic element, resting on the lower support base (3.4.1).

The support (2) comprises a through guiding groove (2.4) extending in an arc. The arm (3) has a rod (3.5) with a head (3.5.1) arranged going through the through housing (3.4) such that a first end of the spring (3.3) rests on the head (3.5.1) of the rod (3.5) and the second end of the spring (3.3), the opposite end, rests on the lower support base (3.4.1) of the through housing (3.4).

The end of the rod (3.5) opposite the head (3.5.1) goes through the lower support base (3.4.1) and the through groove (2.4) of the support (2) reaching the lower face of the support (2). The end of the rod (3.5) opposite the head (3.5.1) has a retaining washer (3.6) intended for resting on the lower face of the support (2), i.e., the face opposite that which the arm (3) is located.

The spring (3.3) is compressed establishing a bias of the arm (3) to move closer to the support (2) since the base of the spring is what is resting on the arm (3).

This solution for locking the arm (3) has been duplicated by incorporating two arms (3). It is possible to lock the arms (3) at any of the points of a specific section instead of in a plurality of specific positions, for example, by incorporating an arc-shaped groove receiving the projection (3.2) and keeping it locked or retained it by means of friction.

FIG. 3 shows the support (2) from a bottom view and particularly the retaining washers (3.6) fixed at the ends of the rods (3.5). This bottom view also allows observing the intermediate part (2.2) containing the fixed shafts (2.2.1) of the two arms (3).

Figure 4B:
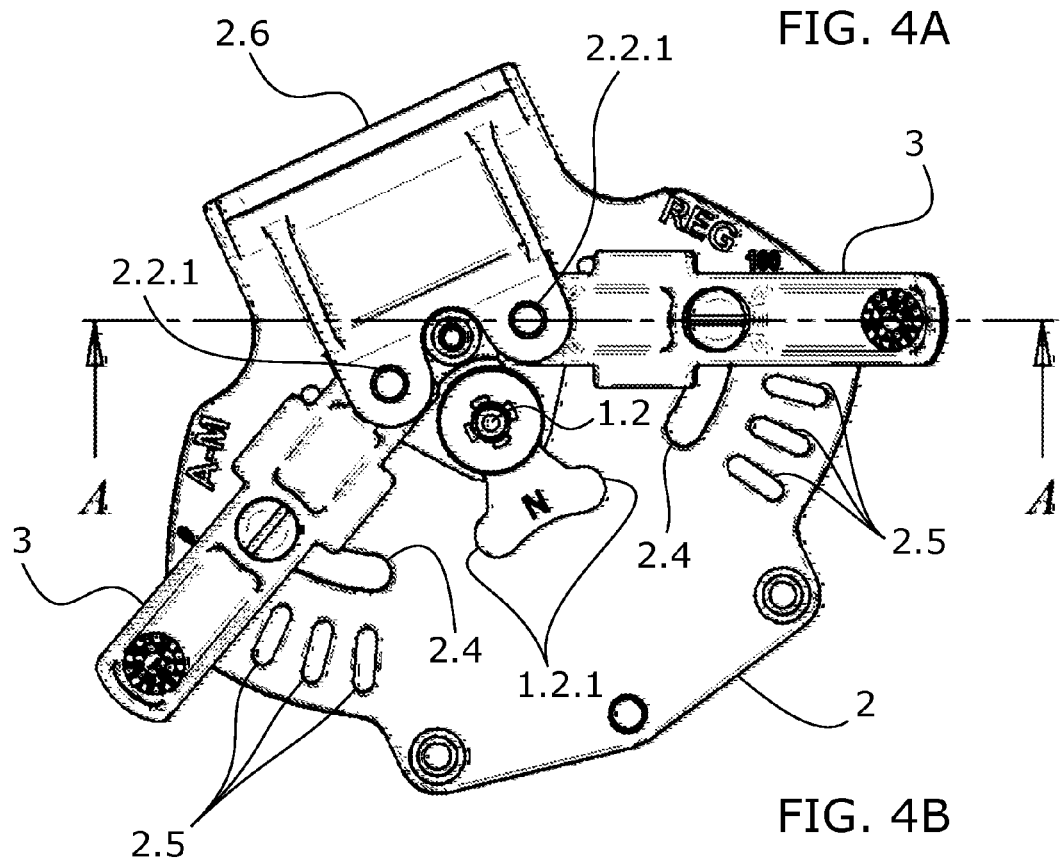
FIG. 4B shows a plan view according to the main plane of the support of the limiting device according to the embodiment and the position of the plane of section which corresponds to the view of FIG. 4A.

FIG. 4B is a plan view which allows observing the two arms (3) in a position determined by the end housing (2.5) of all the available housings (2.5). This view shows the position of the fixed shafts (2.2.1) of both arms located in symmetrical positions with respect to the axis of symmetry of the support (2) according to this view. This axis of symmetry goes through the rotating shaft (1.2) of the projection (1.2.1). The rotation of the plug (1.1) angularly moves the projection (1.2.1) either towards one arm (3) or towards the other arm (3). The movement in either direction is limited by the position of the arm (3) which is in turn determined by the housing in which the flange (3.2) of the arm (3) has been inserted.

Said drawing also indicates section A-A separately shown in FIG. 4A. This section view allows observing in detail the operating mode of the retracting spring (3.3) since the movement of the head of the rod (3.5) is prevented as a result of the retaining washer (3.6) and it allows the spring (3.3) to press the arm (3) against the support (2). The position of the arm (3) when the second locking means (3.2) come out of the first locking means (2.5), pivoting about the shaft (2.2.1) as a result of the geometric shape of the housing (3.1), is also shown. The geometric shape of the housing (3.1) is generated or established by the cylinder of the shaft (2.2.1) in the positions for locking and unlocking the arm (3).

FIGS. 5A, 5B, 5C and 5D are different limit positions conferred by the device of this embodiment. All the drawings show the limiting device in plan view and the position of the plug (1.1) depicted by means of a thick black line below said device.

Figure 5A:
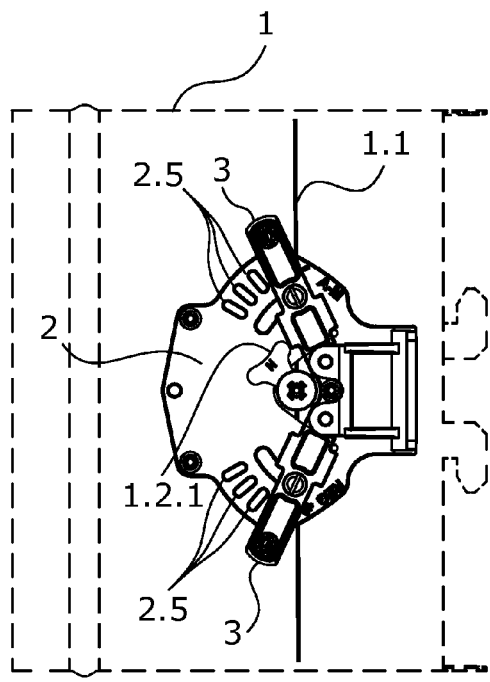
FIGS. 5A-5D are a sequence of drawings showing different examples of the limiting positions of the plug according to the position of the arms.

In FIG. 5A the position of the plug (1.1) completely closes the conduit (1). The projection (1.2.1) integral with the plug (1.1) does not show a symmetrical position with respect to all the components but is abutting one of the arms (3), i.e., the one shown in the upper portion of the drawing. Given that this arm (3) is locked in the last housing (2.5), the position of the plug (1.1) is not limited and it can completely close the section of the conduit (1).

Figure 5B:
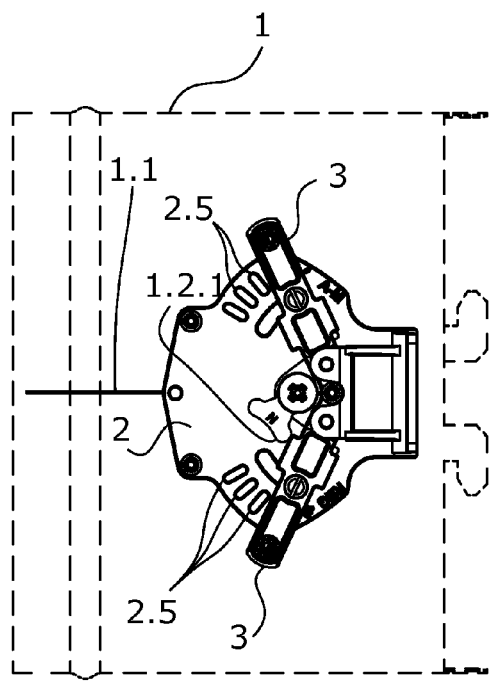

FIG. 5B shows the limiter as it is configured in FIG. 5A, with the two arms (3) locked in the end housings (2.5). Nevertheless, the plug (1.1) is now in the open position given that it is oriented in projection in the direction of the flow, longitudinal to the conduit (1). This position is obtained by rotating the plug (1.1) 90 degrees such that the projection (1.2.1) integral with the plug (1.1) rotates resting on the other arm (3). Given the end position of the arm (3), this support does not prevent the complete opening.

Figure 5C:
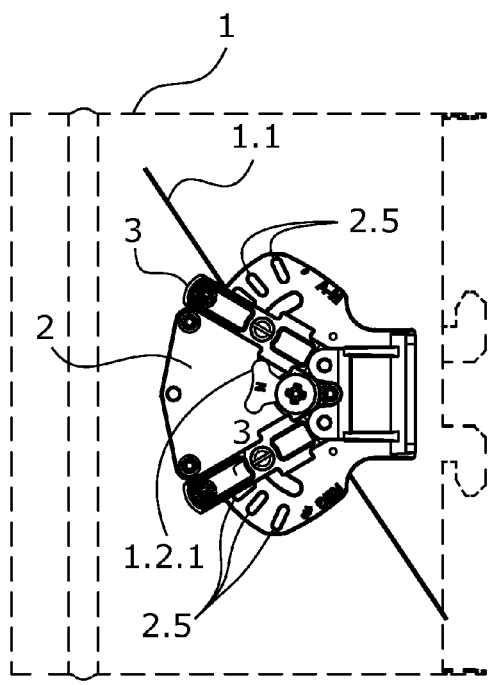
Figure 5D:
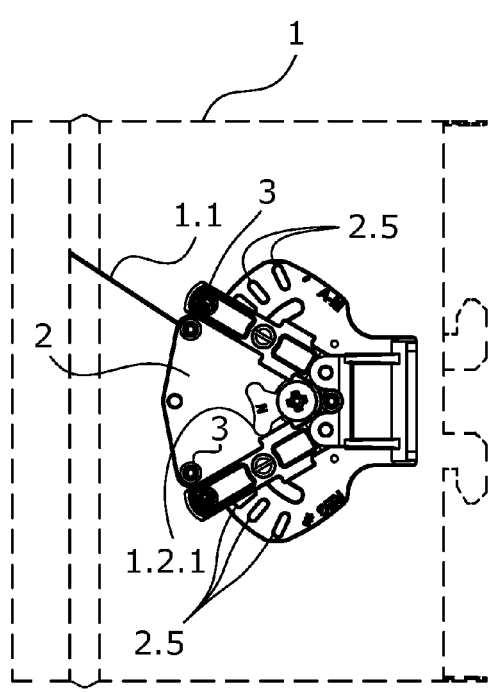

The position of both arms (3) has been modified in FIGS. 5C and 5D causing the locking position to prevent the projection (1.2.1) integral with the plug (1.1) from being able to reach the end positions. FIG. 5C shows that the arm (3) shown in the upper position prevents the complete closure of the plug (1.1), and FIG. 5D shows how the projection now abuts the arm (3) shown in the lower position, preventing complete opening. The range of angular movement of the plug (1.1) between one drawing and the other has been considerably reduced since the two arms (3) have moved closer to one another.

What is claimed is:

1. An opening or closure limiting device suitable for valves of the type which are closed or opened by means of rotating a plug about a rotating shaft and comprising:
    a regulating arm for regulating the maximum value or for regulating the minimum value of the opening of the plug, and
    a support the configuration of which extends in a main plane which is located essentially perpendicular to the direction of the rotating shaft, and where said support comprises:
        fixing means suitable for fixing said support to a conduit in which the valve is located,
        a fixed shaft for the regulating arm, the fixed shaft being arranged essentially perpendicular to the main plane of the support,
        first locking means for locking an angular position of the regulating arm, the regulating arm in turn comprising:
a housing for the fixed shaft for the rotation of the regulating arm about said fixed shaft,
second locking means suitable for retaining the regulating arm in the first locking means in a specific angular position with respect to the support,
where the rotating shaft of the plug has a projection integral with said rotating shaft, the projection being intended to abut the regulating arm, limiting an angular movement of said rotating shaft and therefore of the plug.

2. The device according to claim 1, where the housing of the regulating arm housing the fixed shaft and said fixed shaft are configured to allow an angular movement such that the regulating arm can be separated from the main plane of the support.

3. The device according to claim 2, where the configuration of the surface of the housing is that established by the cylindrical body of the fixed shaft in the positions when the regulating arm coincides with the main plane of the support, and when it is separated therefrom, to allow separating the regulating arm from the main plane of the support.

4. The device according to claim 1, where the first locking means for locking the angular position of the regulating arm comprise a groove and the second locking means of the regulating arm comprise a flange where the groove is suitable for receiving the flange, the flange being retained in the groove once inserted; or vice versa, the first locking means for locking the angular position of the regulating arm comprise a flange, and the second locking means of the regulating arm comprise a groove where the groove is suitable for receiving the flange, the flange being retained in the groove once inserted.

5. The device according to claim 4, where the flange is retained in the groove by means of friction.

6. The device according to claim 4, where the first locking means or the second locking means additionally comprise one or more grooves, giving rise to a plurality of grooves each of them suitable for receiving the flange of the regulating arm, determining different angular positions of the regulating arm.

7. The device according to claim 4, comprising an elastic element suitable for providing the flange retained in the groove with a bias to be housed in said groove.

8. The device according to claim 7, wherein:
the regulating arm has a through housing with a lower support base;
the through housing houses the elastic element in the form of a spring;
the support comprises a through guiding groove extending in an arc;
the regulating arm comprises a rod with a head arranged traversing the through housing such that a first end of the spring rests on the head of the rod and the second end of the spring, the opposite end, rests on the lower support base of the through housing, and where the end of the rod opposite the head goes through the lower support base and the through guiding groove of the support;
the end of the rod opposite the head has retaining means, preferably a retaining washer, that rests on the support,
where the spring is compressed establishing a bias of the regulating arm to move closer to the support.

9. The device according to claim 1, comprising an additional regulating arm for regulating an angular position, each of the regulating arms having corresponding second locking means and the support having first locking means, wherein one of the regulating arms is for regulating the minimum opening of the plug and the other regulating arm is for regulating the maximum opening of the plug, and where the projection of the rotating shaft is suitable for abutting one of the regulating arms in a direction of rotation and is suitable for abutting the other regulating arm in the opposite direction of rotation.

10. The device according to claim 9, wherein each of the second locking means of the regulating arms has corresponding first locking means in the support.

11. The device according to claim 9, wherein the distribution of the regulating arms and of the first locking means is symmetrical with respect to a plane essentially perpendicular to the main plane of the support and goes through the rotating shaft.

12. The device according to claim 1, wherein the second locking means are made up of a flange of the corresponding regulating arm and wherein the first locking means are made up of a plurality of housings for the flange of the second locking means, the plurality of housings being distributed in an arc.

13. The device according to claim 1, wherein the support has a hole for the passage of the rotating shaft such that the regulating arm is arranged on the side of the support opposite where the plug is located.

14. A valve comprising an opening or closure limiting device according to claim 1.

* * * * *